US006888095B2

(12) United States Patent
Khan

(10) Patent No.: US 6,888,095 B2

(45) Date of Patent: May 3, 2005

(54) LASER CODING

(75) Inventor: Nazir Khan, Nottingham (GB)

(73) Assignee: Sherwood Technology, Inc. (GB)

( * ) Notice: Subject to any disclaimer, the term of this patent is extended or adjusted under 35 U.S.C. 154(b) by 0 days.

(21) Appl. No.: 10/344,393

(22) PCT Filed: Feb. 27, 2002

(86) PCT No.: PCT/GB02/00862

§ 371 (c)(1),
(2), (4) Date: Feb. 10, 2003

(87) PCT Pub. No.: WO02/068205

PCT Pub. Date: Sep. 6, 2002

(65) Prior Publication Data

US 2003/0186001 A1 Oct. 2, 2003

(30) Foreign Application Priority Data

Feb. 28, 2001 (GB) .......................................... 01049592
Jun. 19, 2001 (GB) .......................................... 01149772

(51) Int. Cl.[7] .............................................. B23K 26/00

(52) U.S. Cl. ........................... 219/121.69; 219/121.85; 219/121.6

(58) Field of Search ....................... 219/121.69, 121.85, 219/121.6

(56) References Cited

U.S. PATENT DOCUMENTS

| | | | | | |
|---|---|---|---|---|---|
| 3,377,292 | A | * | 4/1968 | Halverson | 252/301.18 |
| 3,592,644 | A | * | 7/1971 | Vrancken et al. | 430/200 |
| 4,906,813 | A | | 3/1990 | Gajdos | |
| 5,053,440 | A | * | 10/1991 | Schueler et al. | 523/137 |
| 5,340,628 | A | | 8/1994 | McKillip | |
| 5,350,792 | A | | 9/1994 | Hess et al. | |
| 5,576,377 | A | * | 11/1996 | El Sayed et al. | 524/495 |
| 5,630,979 | A | * | 5/1997 | Welz et al. | 264/400 |
| 5,783,793 | A | | 7/1998 | Emerton et al. | |
| 5,928,780 | A | | 7/1999 | Schmidt et al. | |
| 5,976,411 | A | * | 11/1999 | Feng et al. | 252/301.35 |
| 5,977,514 | A | * | 11/1999 | Feng et al. | 219/121.69 |
| 6,017,972 | A | | 1/2000 | Harris et al. | |
| 6,019,831 | A | | 2/2000 | Schmidt et al. | |
| 6,207,240 | B1 | * | 3/2001 | Schoenfeld et al. | 427/555 |
| 6,207,344 | B1 | * | 3/2001 | Ramlow et al. | 430/270.1 |
| 6,214,916 | B1 | * | 4/2001 | Mercx et al. | 524/404 |
| 6,214,917 | B1 | * | 4/2001 | Linzmeier et al. | 524/430 |
| 6,326,132 | B1 | * | 12/2001 | Toya et al. | 430/523 |
| 6,521,688 | B1 | * | 2/2003 | Linzmeier et al. | 524/430 |
| 6,545,065 | B2 | * | 4/2003 | Solms et al. | 523/171 |

FOREIGN PATENT DOCUMENTS

| | | | | | |
|---|---|---|---|---|---|
| CA | 1284125 | | | 5/1991 | |
| EP | 0 327 508 | A2 | | 2/1989 | |
| EP | 0 522 370 | A1 | | 6/1992 | |
| EP | 0 708 147 | A1 | | 10/1995 | |
| EP | 708147 | A1 | * | 4/1996 | C08L/55/02 |
| EP | 0 782 933 | A1 | | 12/1996 | |
| EP | 782933 | A1 | * | 7/1997 | B41M/5/36 |
| EP | 0 841 187 | A1 | | 5/1998 | |
| JP | 11001065 | | | 1/1999 | |
| WO | WO 95/30546 | A1 | | 11/1995 | |
| WO | WO 00/43456 | A1 | | 7/2000 | |
| WO | WO 02/00920 | A2 | | 1/2002 | |
| WO | WO 02/068205 | A1 | | 9/2002 | |

* cited by examiner

*Primary Examiner*—M. Alexandra Elve
(74) *Attorney, Agent, or Firm*—Saliwanchik, Lloyd & Saliwanchik

(57) ABSTRACT

A method for making an object, wherein the object comprises a material including a functional group and a metal compound or acid that causes an elimination reaction on irradiation with a laser, to form a reaction product of contrasting colour, comprises directing a laser beam on to the areas of the object to be marked. For example, by using a carbohydrate and a metal salt, effective marking can be achieved on the coating of a pill or other edible material.

13 Claims, No Drawings

LASER CODING

This application is a National Stage Application of International Application Number PCT/GB02/00862, published, pursuant to PCT Article 21(2).

FIELD OF THE INVENTION

This invention relates to laser coding, particularly of edible materials.

BACKGROUND OF THE INVENTION

Laser coding is well known; see, for example, U.S. Pat. No. 5,733,793, U.S. Pat. No. 4,906,813 and also U.S. Pat. No. 5,340,628 which seeks to contain the particles produced by ablation. These methods present a variety of problems, including difficulties in maintenance, line down-time, taint, as well as the need for extraction. More generally, the apparatus and problems of printing, i.e. ribbons, inks, solvents, maintenance, unreliability, etc., are particularly undesirable where sensitive products like foods and pharmaceuticals are packaged.

Various proposals have been made, in order to achieve effective printing without ablation, and without applying ink at the point of coding, but rather by causing a change of colour in the substrate on which the printing is to appear. Various pigments have been proposed, which can be used to mark a substrate on the application of laser energy. Some of these proposals may be found in, for example, WO-A-00/43456, JP-A-11001065, EP-A-0522370, EP-A-0797511, U.S. Pat. No. 5,053,440, U.S. Pat. No. 5,350,792 (a plastic moulding composition comprising a polyoxymethylene and animal charcoal), U.S. Pat. No. 5,928,780, U.S. Pat. No. 6,017,972 and U.S. Pat. No. 6,019,831.

On-line coding methods commonly used for the pharmaceutical, foods and confectionery industries are ink-jet and thermal transfer (including hot stamping).

SUMMARY OF THE INVENTION

The present invention is based on the utility of particular materials which can undergo a colour change on the application of laser energy, and the realisation that these include edible materials which can therefore be used to mark materials intended for consumption.

According to this invention, a method for marking an object, wherein the object comprises a material including a functional group and a metal compound or acid that causes an elimination reaction on irradiation with a laser, to form a reaction product of contrasting colour, which comprises directing a laser beam on to the areas of the object to be marked.

Depending on the nature of the components that are used, and the reaction product, they may be physiologically acceptable. This means that the invention can be used in the making of foodstuffs and pharmaceutical products such as tablets and pills.

The method of the present invention overcomes the problems associated with printing, as described above. It allows significant cost savings for most normal production lines, and the opportunity to improve on the quality of the coding produced on foodstuffs and other products. Further advantages of the invention are that it can be highly reliable, involves low maintenance costs, and avoids solvents, emissions, debris and extraction. The invention provides on-line, non-contact coding, with reduced line down-time. The method of the invention can be used to replace all current coding systems, at the highest line speeds. There is no need for the purchase or stocking of materials associated with printing, and yet the quality of print can be improved. Adhesion problems and smudging can be avoided. There is no need to pierce wrapping film. Further, it is possible to code in damp conditions.

DESCRIPTION OF THE INVENTION

In accordance with the invention, suitable additives are provided in a coating on a solid substrate, e.g. foodstuff, including confectionery, or pharmaceutical dosage units such as a tablet or pill. Such coatings are known, and may simply be modified according to the invention by inclusion of materials which react with each other, essentially to form a dye or chromophore in situ. The product is intended for consumption or (if pharmaceutical) oral administration, in which case the additive(s) and any reaction product are edible.

In one embodiment of this invention, the additives are a polyhydroxy compound and a dehydrating agent. The latter is typically a metal salt of the type that, as is known, can be used to remove OH groups (which for the purposes of this specification are functional groups) from sugars, e.g. sucrose, starches, modified starches, cellulose, modified celluloses, etc. Examples of suitable metal salts are alkali metal, alkaline earth metal, iron oxide/salts and organometallics. Thus, for example, when heated by the application of laser energy, sucrose in the presence of MgO or FeO etc. will char. Other examples of materials that will give a colour change by dehydration (elimination of water) in the presence of a metal salt include:

Hydroxypropylcellulose
Methylhydroxypropylcellulose
Sodium carboxymethylcellulose
Polyvinyl alcohol Suitable metal salts for this purpose include:

$MgCl_2$
$Mg(OH)_2$
CaO
FeO
$Fe_2O_3$
$CaSiO_3$
Zn acetate
ZnO
alumino-silicates In a further embodiment of the invention, the elimination reaction may comprise dehalogenation, dehydrohalogenation or deacetylation, in which case the relevant functional group is a halogen atom or carboxyl group. Examples of additives for this purpose are vinyl polymers, typically in the present of a metal salt. Suitable polymers include:

Polyvinyl chloride (PVC)
Polyvinyl acetate
Vinyl esters
Vinyl chloride/acetate copolymer
Vinyl chloride/maleate copolymer Suitable metal compounds for this purpose include:

ZnO
Zn salicylate
Kaolin
$CaSiO_3$

Yet another embodiment of the invention uses additives that undergo deetherification. Thus, for example, ethyl cellulose and a metal salt will give a colour on irradiation.

The examples given above are primarily of metal salt-induced elimination. A further embodiment of the invention is acid or base-induced dehydration/dehalogenatior/dehydrohalogenatior/deacetylatiorideetherification. Thus, for example, a colour is generated using p-toluenesulphonic acid with PVOH (polyvinyl alcohol).

Based on this information, other suitable materials will be known, or can be readily chosen or tested for their suitability, by those of ordinary skill in the art.

A particular advantage of the invention is that the object to be marked may be pre-wrapped, provided that the wrapping is transparent to the applied energy; in other words, film-wrapped tablets or other such products can be printed by means of the present invention. Many commonly available wrapping films have been found to be transparent to IR laser energy, including PE, PP, PET, PVC, cellulose and cellulose acetate.

As indicated above, the or each additive may be responsive to UV or IR radiation, and any suitable materials may be used, provided that they can produce a colour change. The change may be due to the material undergoing chemical or physical change as a result of the absorption of laser energy, or as a result of that energy being converted to thermal energy. Thus, for example, polyvinyl alcohol is known as a coating ingredient; if a dehydrating agent such as p-toluenesulphonic acid is included in the coating, the application of energy can lead to conjugation and a colour change. Further examples of suitable materials include carbohydrates that can be caramelised, and a combination of ethylcellulose with calcium hydroxide. Preferably, the additive or an existing component will strongly absorb the radiation.

The space allocated on a package for the batch code, sell-by date, etc. is usually a small patch printed in a light colour to give good contrast to the (normally) black print. Using the system of the invention, this may be a white or lightly-coloured patch, which is printed with a laser-sensitive ink. On exposure to a threshold dose of laser energy, the ink changes colour to give the code. The patch may be printed down by a known printing technique, e.g. by flexo or gravure, as the packaging is made.

The object to be marked may be formulated with the additional components that allow marking. In a preferred embodiment, these components are formulated and used to coat a substrate. For application to the substrate, the material or materials used in this invention may be formulated in an aqueous or non-aqueous system, as a solution or dispersion. For coating on pills, the transparency of the coating is not usually a consideration, but the use of a solution of components may be preferred, in order to provide a clear coating on certain substrates. Since it may determine the clarity of the marking that can be achieved, coating may be done more than once, if desired.

The amounts of the components that are used in the invention can readily be chosen by one of ordinary skill, having regard to the intended use. For example, a coating composition may comprise 0.1 to 20% w/v of each component.

It has been demonstrated that, in accordance with the invention, single or multiple layers of water-based edible laser-scribable coatings can be applied to unpolished or polished tablets by a conventional tablet coating process. On top of the coating, a layer of the camauba wax can be applied by a conventional coating process without any difficulty.

Tablets coated with three or more layers of the water-based edible coatings are markable with $CO_2$ laser and afford good quality grey/green laser marking. The coatings are laser-markable through the layer of carnauba wax.

Typically, the necessary energy will be a laser beam. For example, a print engine for an IR coding system comprises a robust, low-power $CO_2$ laser, e.g. operating at about 10,600 nm. The laser can operate in either the dot matrix mode or continuous-wave, scribing mode. In this latter mode, improved quality of print can be obtained. Because of the low output of the laser, highly reliable, approaching maintenance-free, operation is offered. The system can operate in a scribe mode, and coding onto moving lines at up to 200 m/min is possible. For higher speeds than this, dot matrix printing is suitable.

The system can be used for coding through packing film, or coding into film laminates. A low-power laser ensures that puncturing does not occur.

The following Examples illustrate the invention.

EXAMPLES 1 TO 12

Materials etc are shown in the following Table. Those of Examples 9 to 12 are particularly suitable for use as an edible composition.

In each case, a lacquer was mixed, coated and dried before marking with a $CO_2$ laser, using a beam of 0.3 mm diameter and scan speed of 1000 $mms^{-1}$. Vinnol is a vinyl chloride/acetate copolymer supplied by Stort Chemicals. Vycar is a copolymer of vinyl chloride and an acrylic acid supplied by Goodrich.

| Example | Binder | Quantity (g) | Additive | Quantity (g) | Solvent | Quantity (g) | Laser Power (W) | Colour of Image |
|---|---|---|---|---|---|---|---|---|
| 1 | Vinnol 14/36 | 5 | Zinc chloride | 0.5 | MEK | 8 | 5 | Black |
| 2 | Vinnol 14/36 | 5 | Zinc oxide | 1 | MEK | 10 | 6–7 | Black |
| 3 | Vinnol 14/36 | 3 | Zinc oxide<br>Calcium silicate | 0.3<br>0.2 | MEK | 6 | 5–6 | Black |
| 4 | Vinnol 14/36 | 3 | Zinc oxide<br>Kaolin | 0.3<br>0.3 | MEK | 6 | 5–6 | Black |
| 5 | Vinnol 14/36 | 2 | Calcium silicate | 0.3 | MEK | 5 | 5–6 | Yellow |
| 6 | Vinnol 14/36 | 4 | Zinc 3,5-di-tert butyl salicylate | 1 | MEK | 10 | 5–6 | Black |
| 7 | Vinnol 14/36 | 3 | Irgacure 261 | 1 | MEK | 6 | 5–6 | Black |
| 8 | Vycar 577-E | 10 | Zinc Oxide | 1 | Water | 4.8 | 3 | Yellow |
| 9 | Klucel (hydroxy propyl cellulose) | 2 | Magnesium chloride | 1 | Water | 15 | 5–6 | Yellow |
| 10 | Culminal (methyl hydroxy propyl cellulose) | 1 | Magnesium chloride | 1 | Water | 10 | 5–6 | Yellow |

-continued

| Example | Binder | Quantity (g) | Additive | Quantity (g) | Solvent | Quantity (g) | Laser Power (W) | Colour of Image |
|---|---|---|---|---|---|---|---|---|
| 11 | Ethyl cellulose | 2 | Calcium hydroxide | 1 | Ethanol | 15 | 6–7 | Yellow |
| 12 | Blanose (sodium carboxy methyl cellulose) | 1.5 | Calcium hydroxide | 1 | Water | 10 | 6 | Yellow |

EXAMPLE 13

100 g sodium carboxymethylcellulose was added portionwise to 2000 g water, with stirring. Once the addition was complete, stirring was continued until complete dissolution of the polymer was achieved.

100 g $MgCl_2.6H_2O$ was added portionwise to the polymer solution. After the addition was complete, the mixture was stirred for approx. 10 min, to give a coating solution. 2 kg tablets were charged into a coating pan. The coating pan containing the tablets was rotated at constant speed, and then the tablets were warmed up to 50° C. using a hot air dryer.

For a first coating layer, 10 ml of the coating solution was added and the coating pan was allowed to rotate at constant speed and ambient temperature for approximately 10–15 minutes. The coated tablets were warmed to approximately 50° C. with a hot air dryer whilst the pan was rotated at constant speed. A 200 g sample of the coated tablet was taken. Using two more 10 ml volumes of the coating solution, the coating procedure was repeated twice.

Laser marking of the coated tablets was investigated using a 10 W Alltec CS smart carbon dioxide laser. Parameters used for the marking of the tablets are presented below:

| | |
|---|---|
| Laser frequency | 20000 Hz |
| Power | 7 Watts |
| Scan velocity | 500 mm/sec |
| Line width | 50 μm |
| Lens | 200 mm |

A reasonable dark greylgreen image was obtained.

EXAMPLE 14

The procedure of Example 13 was repeated, except that the tablet was polished, i.e. a final coat of wax was applied by the addition of 805 mg of a 50% ethanolic solution of camauba wax to the coating pan. Again, a reasonable dark grey/green image was obtained. The same result was obtained if the tablet was polished underneath, i.e. if the coating of laser-sensitive material was on top of a coating of carnauba wax.

EXAMPLE 15

The procedure of Example 13 was repeated, but using a solution obtained from 30 g sodium carboxymethylcellulose, 30 g $MgCl_2$. $6H_2O$ and 400 g water. A good grey/green image was obtained, with or without polishing (as described in Example 14).

EXAMPLE 16

The procedure of Example 13 was repeated, but using a coating solution obtained by adding 750 g Vinnol 14/36 portionwise to 1500 g 2-butanone (MEK) with stirring, until the addition is complete, followed by stirring until dissolution of the polymer is complete, followed by the addition of 150 g zinc oxide portionwise with stirring, and for 30 minutes after addition is complete, to disperse the zinc oxide uniformly. Laser marking gave a dark black image.

What is claimed is:

1. A method for marking an object, wherein the object comprises a material including a functional group and a metal compound or acid that reacts with the functional group and causes an elimination reaction on irradiation with a laser, to form a reaction product of contrasting colour, which comprises directing a laser beam on to the areas of the object to be marked, whereby those areas are marked by the presence of said reaction product.

2. The method according to claim 1, wherein the material is polymeric and undergoes deetherification, dehalogenation, dehydrohalogenation or deacetylation in the presence of a metal salt or acid.

3. The method according to claim 2, wherein the material undergoes dehalogenation.

4. The method according to claim 1, wherein the material is a vinylic polymer.

5. The method according to claim 4, wherein the vinylic polymer is polyvinyl chloride, polyvinyl acetate, a vinyl ester, a vinyl chloride/acetate copolymer or a vinyl chloride/maleate copolymer.

6. The method according to claim 1, wherein the metal compound is a salt, oxide or silicate.

7. The method according to claim 1, wherein the material is a polyhydroxy compound and the elimination occurs in the presence of an acid or metal salt.

8. The method according to claim 7, wherein the polyhydroxy compound is a carbohydrate.

9. The method according to claim 7, wherein the polyhydroxy compound is cellulosic.

10. The method according to claim 1, wherein the object is a pharmaceutical or foodstuff.

11. The method according to claim 1, wherein the object comprises a substrate and, coated thereon, a coating comprising the polymeric material and the metal compound.

12. The method according to claim 1 wherein the object is a tablet or pill and the substrate comprises a pharmaceutical agent.

13. The method according to claim 1, wherein the object is wrapped or covered in a filmic material.

* * * * *